Dec. 10, 1935.   H. J. HEINS   2,023,836
APPARATUS FOR HANDLING AND DISPENSING LOOSE MILK
Original Filed Dec. 2, 1932   2 Sheets-Sheet 2
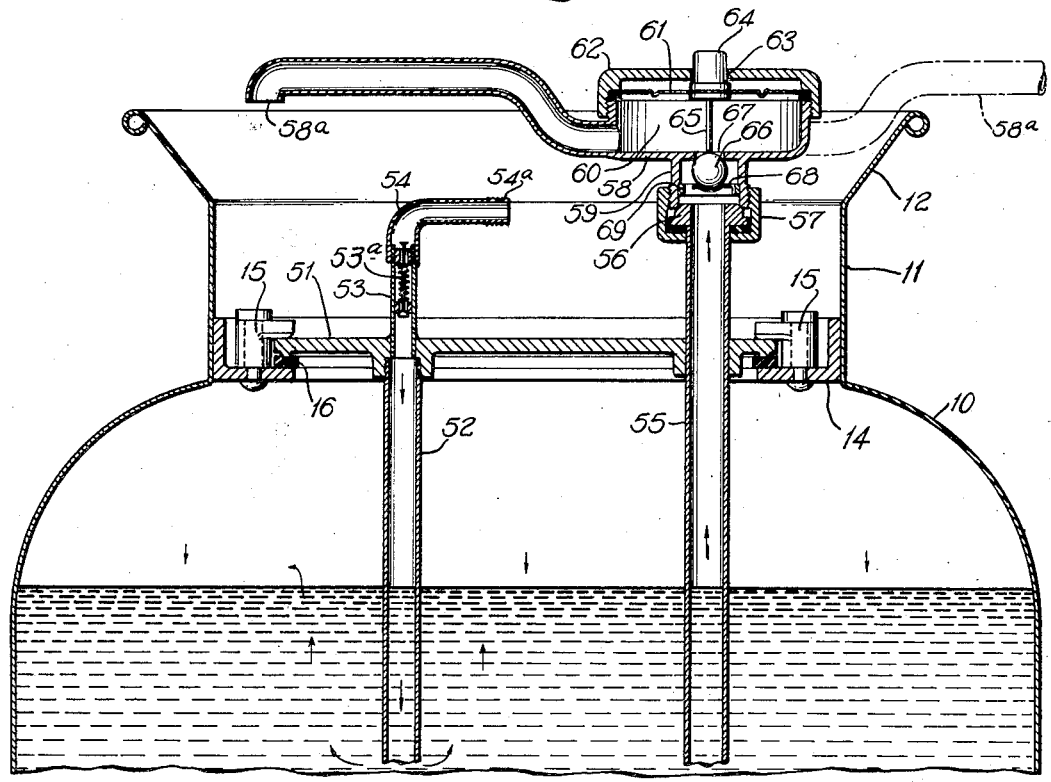
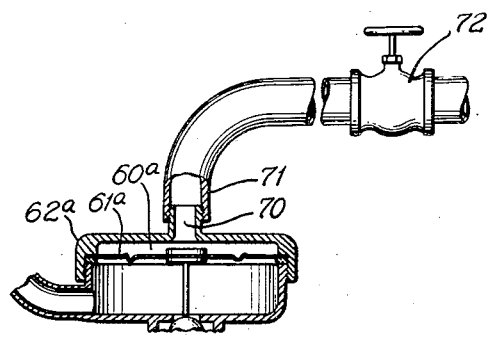
INVENTOR.
Harry J. Heins
BY
ATTORNEY.

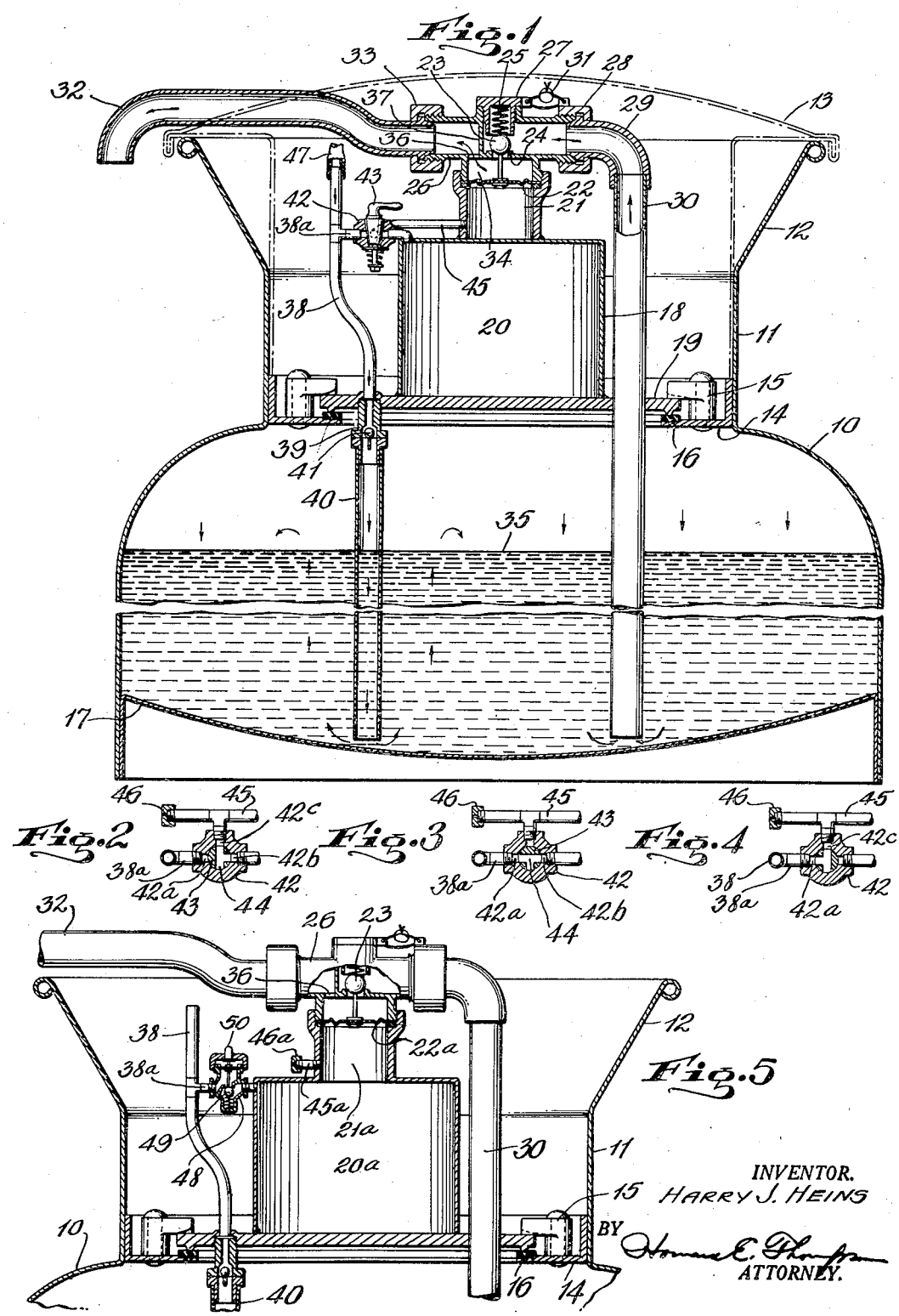

Patented Dec. 10, 1935

2,023,836

UNITED STATES PATENT OFFICE 2,023,836

APPARATUS FOR HANDLING AND DISPENSING LOOSE MILK

Harry J. Heins, Jersey City, N. J.

Application December 2, 1932, Serial No. 645,357
Renewed May 17, 1935

15 Claims. (Cl. 221—74)

This invention relates to apparatus for dispensing loose milk from a milk can of conventional construction or from a suitable container of any kind or class; and the object of the invention is to provide a simple and yet positive method of dispensing milk from containers of the class described to render such dispensing sanitary and to insure the sanitary storage of the milk in the can or container during the several dispensing operations; a further object being to provide an apparatus of the class described in the form of an attachment readily attachable and detachable with respect to a container, and which by virtue of its construction can be quickly and easily cleaned to maintain its sanitary condition at all times; a further object being to provide a dispensing attachment of the class described employing an air chamber into which compressed air is adapted to be passed and with means for utilizing the air introduced into the chamber for controlling and regulating the amount of milk discharged from the container during each operation of the apparatus; a further object being to provide an air control involving a priming chamber and an actuating chamber with a valve for controlling the transmission of air from one chamber to the other and from a source of supply to said priming chamber; and with these and other objects in view, the invention consists in an apparatus of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a sectional view through a milk can showing one form of dispensing attachment mounted in connection therewith.

Figs. 2, 3 and 4 are sectional detail views showing several positions of the control valve shown in Fig. 1.

Fig. 5 is a view similar to Fig. 1 but showing only a part of the construction and showing a modification.

Fig. 6 is a view similar to Fig. 1 showing another modification; and,

Fig. 7 is a sectional detail of a part of the construction shown in Fig. 6 showing another modification.

In Figs. 1 and 5 of the drawings, 10 represents a milk can of conventional form, at the upper end of which is a contracted collar portion 11 terminating in an outwardly flared wall 12 in connection with which the usual cover is mounted, the cover being indicated at 13 in dot and dash lines in Fig. 1 of the drawings.

Within the collar portion 11 is an angle iron plate 14 having a plurality of retaining lugs or clips 15 for securing a dispensing attachment in position and to form a seal upon a gasket or washer 16. In Fig. 1 of the drawings, I have indicated at 17 the bottom of the container and in said figure, I have shown at 18, one form of my attachment which consists of a bottom plate 19 upon which is arranged a priming air chamber 20, above which is a supplemental valve actuating air chamber 21 in which is supported a diaphragm 22 which carries a ball valve 23, normally engaging a seat 24 by a spring 25, the seat being formed in a T-shaped pipe or coupling 26, whereas the spring 25 seats in a tubular nut 27. Attached to one end of the coupling 26 by means of a flange nut 28 is an elbow 29 with which a feed pipe 30 is coupled, the pipe 30 extending downwardly through the plate 19 into the can 10 and its lower end is disposed adjacent the bottom 17 of such can. At 31, I have shown a seal coupled with the nut 27 and the nut 28 to prevent tampering with the device, and this seal may or may not be employed.

To the other end of the coupling 26 is attached a discharge nozzle 32 by means of a flange nut 33, and it will be understood that the spout 32 may be attached and detached at will and is removed in the transportation of the container 10 from place to place so as to permit the mounting of the cover 13 in position. At this time, it will be understood that other types of discharge spouts or elements may be employed.

Above the diaphragm 22 is a chamber 34 into which the milk 35 from the container passes through the opening controlled by the valve 23. At 36, I have shown a passage leading from the chamber 34 into the coupling 26 on the nozzle side of the partition wall 37. It will thus be seen that in order to discharge the milk from the container the valve 23 must be raised from the seat 24 against the action of the spring 25. Mounted in connection with the plate 19 is an air supply pipe 38 which opens into a coupling 39 to which a pipe 40 is attached.

The pipe 40 extends downwardly into the container 10 to a point adjacent the bottom wall 17 thereof. Within the coupling 39 is a ball check valve 41 which prevents any possible back pressure of the milk through the pipe 40 and pipe 38.

Extending from the pipe 38 is a branch pipe 38a which opens into the upper end of the chamber 20 and in the pipe 38a is arranged a control valve device 42 having three branches 42a, 42b and 42c controlled by the tapered valve 43 having a three way port 44 adapted to register with the respective branches as clearly seen in Figs. 2, 3 and 4 of the drawings. The pipe 38a or its separate parts couple with the branches 42a and 42b, whereas a vent pipe 45 is coupled with the branch 42c and with the chamber 21, the vent pipe having at its end a bleeder nozzle 46.

In practice, a rubber hose or other flexible tube 47 is coupled with the pipe 38 to supply air under pressure to said pipe, the latter being controlled from a compressed air supply apparatus of any desired form and construction, which in itself forms no part of this invention. The operation of the apparatus shown in Fig. 1 of the drawings will be readily understood from the foregoing description and the following statement.

After air has been admitted into the pipe 38, which will operate upon the fluid or milk 35 to cause the same to rise in the pipe 30, the valve will be rotated into the position shown in Fig. 3 of the drawings to admit air into the priming chamber 20. From this position of the valve, when it is desired to discharge a predetermined quantity of milk from the nozzle 32, the quantity being fixed by the size of the chamber 20 with a given air pressure, the valve 43 will be rotated into the position shown in Fig. 2 so as to permit the transmission of air from the chamber 20 into the chamber 21, in which operation, the diaphragm 22 will be raised by such air pressure and held open until the pressure in the chamber 21 is lost by the discharge of air therefrom through the bleeder nozzle 46, at which time, the spring 25 will return the valve 23 to its seated position and stop the discharge of milk through the nozzle 32.

In practice, it is found desirable to discharge a pint of milk from the container 10 in one operation of the valve, and if a quart of milk is desirable, the operation is repeated. At this time, it will be understood that almost instantaneous action may be produced through the manipulation of the valve 43, first turning it into the position shown in Fig. 3, and then back into the position shown in Fig. 2.

In some instances, it may be desirable to discharge a small quantity of fluid from the container or a large quantity of milk therefrom. In this event, the valve may be turned into the position shown in Fig. 4 to provide for a direct transmission of compressed air into the chamber 21, which will operate to hold the diaphragm 22 in raised position as long as the valve is retained in the position stated.

In Fig. 5 of the drawings, I have shown a slight modification, in which a chamber 20a is substituted for the chamber 20, the chamber 20a having an extension 21a in direct communication therewith and which is exposed to the diaphragm 22a. With this construction, a pipe 45a extends from the chamber 21a and has a bleeder nozzle 46a controlling the escape of compressed air. Arranged in the branch 38a of the air pipe 38 is a valve device 48 which controls the supply of compressed air to the chamber 20a—21a. A spring seat ball valve 49 is employed in the device 48 and is moved into open position by a push button 50. In the depression of the button 50 to open the valve 49, air will be admitted into the chamber 20a—21a to control the discharge of fluid through the container, and the time for holding the button 50 down will regulate the amount of milk discharged from the container. As a matter of fact, in the present instance, a quick downward movement of the button 50 and an instantaneous release thereof will perform the desired operation, but this control and operation may be regulated in any desired manner. Aside from the foregoing modifications, the structure shown in Fig. 5 is identical with that shown in Fig. 1 of the drawings and like references will represent like parts.

It will be understood that the size of the discharge openings in the bleeder nozzles 46, 46a, in proportion to the size of the chambers 21 or 20a—21a, as well as the pressure of air used, will regulate the quantity of fluid discharged.

In Fig. 6 of the drawings, I have shown another form of attachment to a milk can 10 or to the angle iron ring 14 mounted in the neck 11 thereof, the can having the flared open end 12. The attachment consists of a closure plate 51, the periphery of which is adapted to seat on the ring 14 or a gasket 16 thereon and is held in position by clamps 15 as in the structure shown in Figs. 1 and 5. Coupled with the plate 51 is a compressed air tube 52 which extends down into the can 10, and another tube 53 projects from the top of the plate and with which is coupled an elbow 54 threaded as seen at 54a to receive a pipe or coupling for transmitting air from a suitable source of supply to the tubes 53 and 52, the air passing through a check valve 53a which prevents back pressure in the tube 52, as will be apparent. Mounted in the plate 51 is a milk discharge tube 55 which extends downwardly to the bottom of the can 10 and projects upwardly through the plate and is flanged at its upper end as seen at 56 in connection with which a coupling collar 57 operates in coupling a discharge spout or nozzle 58 with the tube 55. The spout 58 has a tubular extension 59 which seats upon the upper end of the tube 55 and is held in place by the coupling collar 57. This construction forms a swivel mounting permitting the movement of the nozzle 58 from the position shown in full lines in Fig. 6 to the position indicated in dotted lines, in which latter position, the discharge end 58a of the nozzle is disposed outwardly of the flared end 12 of the can. At the inner end of the nozzle 58 is a large chamber 60 in the upper end of which is supported a diaphragm 61 held in place by a removable cap 62 having a central opening 63 for supporting a push button 64 employed for flexing the diaphragm 61 to depress a pin or rod 65 arranged centrally thereof to forcibly unseat a ball valve 66 so as to permit the discharge of milk from the tube 55 and tubular extension 59 through a port 67 controlled by the valve 66. The valve is supported in its seated position by a flat spring 68 mounted in the tubular extension 59 or coupled with a retaining ring 69 therein.

Instead of employing the manual push button control for the valve 66 as shown in Fig. 6 of the drawings, the retaining cap 62a for the diaphragm 61a has an upwardly directed, externally threaded tube 70 with which is coupled an air supply pipe 71 having a suitable valve control at 72 for opening the valve 66 by the flexure of the diaphragm 61a by means of the compressed air supplied to the chamber 60a above said diaphragm. This construction becomes similar in its operation to the structure shown in Figs. 1 and 5 of the drawings aside from the fact that the air supply is from an external source rather than a source constituting part of the attachment which is housed in the upper end of the can.

It will also be understood that with the structure shown in Figs. 6 and 7 of the drawings, the nozzle discharge is normally contained within the upper open end of the container or milk can and within the cover provided therefor and can be swung out into a discharging position in the operation of dispensing the milk. The type of device shown in Figs. 6 and 7 is adapted primarily for use in dispensing milk of different quantities without dwelling on the importance of measuring the particular amount discharged, in other words, in discharging milk into containers of fixed sizes, the filling of which would give the accurate measurement, and furthermore, this type of device lends itself for use in restaurants and similar places where varying quantities and relatively small quantities of milk are discharged from time to time.

In stating throughout the specification that I dispense a predetermined quantity or amount of milk to produce an accurate measurement, it is to be understood that this reference is to be interpreted as substantially accurate, in the same sense and meaning as the measurement of milk commonly practiced in the sale thereof under existing conditions. At no time are these measurements dead accurate, but are always reasonably within the measured amount required. At this time it is to be also understood that the introduction of the compressed air into the milk container in the manner indicated by the arrows in Fig. 1 and Fig. 6 and the transmission of the air through the milk serves to establish an agitation thereof which will serve to mix the milk and cream as will be apparent. This is primarily due to the fact that the compressed air is introduced into the bottom of the container or can, rather than at the top thereof.

It will be understood that while I have described my invention as adaptable for use in connection with milk containers or milk cans, I am not necessarily limited to this use, as the dispensing device may be employed in conjunction with dispensing fluids of any kind or class, and the apparatus may be constructed to discharge definite quantities of fluid, depending upon the requirements in the various possible uses thereof, and other changes in and modifications of the construction herein shown and described may be made within the scope of the appended claims without departing from the spirit of my invention or sacrificing its advantages.

Having fully described my invention, what I claim as new and desire to secure by Letters Patent, is:

1. The combination with a milk container of the class described, of a dispensing device for discharging predetermined quantities of the milk from the container, said device comprising a compressed air pipe opening into the container adjacent the bottom thereof, a discharge pipe, the inner open end of which is exposed to the milk in the container, a valve casing at the outer end of said discharge pipe, a nozzle on said casing, a valve in said casing controlling the communication between said discharge pipe and nozzle, a diaphragm in operative engagement with said valve, and means for operating said diaphragm to control the actuation of said valve.

2. The combination with a milk container of the class described, of a dispensing device for discharging predetermined quantities of the milk from the container, said device comprising a compressed air pipe opening into the container adjacent the bottom thereof, a discharge pipe, the inner open end of which is exposed to the milk in the container, a valve casing at the outer end of said discharge pipe, a nozzle on said casing, a valve in said casing controlling the communication between said discharge pipe and nozzle, a diaphragm in operative engagement with said valve, means for operating said diaphragm to control the actuation of said valve, and a check valve in said compressed air pipe for holding a prevailing pressure in the container.

3. The combination with a milk container of the class described, of a dispensing device for discharging predetermined quantities of the milk from the container, said device comprising a compressed air pipe opening into the container adjacent the bottom thereof, a discharge pipe, the inner open end of which is exposed to the milk in the container, a valve casing at the outer end of said discharge pipe, a nozzle on said casing, a valve in said casing controlling the communication between said discharge pipe and nozzle, a diaphragm in operative engagement with said valve, and means involving the compressed air supply acting upon the diaphragm controlling the operation of said valve to permit the transmission of milk from the container through said discharge nozzle.

4. The combination with a milk container of the class described, of a dispensing device for discharging predetermined quantities of the milk from the container, said device comprising a compressed air pipe opening into the container adjacent the bottom thereof, a discharge pipe, the inner open end of which is exposed to the milk in the container, a valve casing at the outer end of said discharge pipe, a nozzle on said casing, a valve in said casing controlling the communication between said discharge pipe and nozzle, a diaphragm in operative engagement with said valve, means acting upon the diaphragm controlling the operation of said valve to permit the transmission of milk from the container through said discharge nozzle, and means independent of the diaphragm for normally holding the valve in closed position.

5. The combination with a milk container of the class described, of a dispensing attachment detachably supported at the open end of the container and forming an air tight closure for the container and by means of which milk may be discharged therefrom, said attachment comprising a pressure element supply pipe extending into the container to a point adjacent the bottom thereof, a discharge pipe, the inner open end of which is exposed to the milk in the container, a valve casing at the outer end of said discharge pipe, a discharge nozzle on said casing, a valve in said casing controlling the communication between said discharge pipe and nozzle, manually actuated and controlled means including a diaphragm for actuating said valve to control the discharge of milk from said container, the nozzle being normally disposed within the circumferential boundaries of the open end of the container, and means whereby the nozzle may be moved to position the discharge end thereof beyond said boundaries.

6. The combination with a milk container of the class described, of a dispensing attachment detachably supported at the open end of the container and forming an air tight closure for the container and by means of which milk may be discharged therefrom, said attachment comprising a pressure element supply pipe extending into the container to a point adjacent the bottom thereof, a discharge pipe, the inner open end of which is exposed to the milk in the container, a valve casing at the outer end of said discharge pipe, a discharge nozzle on said casing, a valve in said casing controlling the communication between said discharge pipe and nozzle, manually actuated and controlled means including a diaphragm for actuating said valve to control the discharge of milk from said container, the nozzle being normally disposed within the circumfertial boundaries of the open end of the container, means whereby the nozzle may be moved to position the discharge end thereof beyond said boundaries, and said last named means including a swivel mounting of the casing on said discharge pipe.

7. A dispensing unit for milk containers of the class described comprising a closure plate, means for detachably supporting said plate within the container inwardly of the open end thereof and for forming an air tight connection of the plate with the container, a pressure element supply tube mounted in said plate and extending into the lower end of the container to place the milk therein under pressure and the upper end of said tube extending to the open end of the container to be coupled with a source of supply of the pressure element, a discharge pipe in said plate and opening into the bottom of the container and outwardly at a point above said plate and within the open end of said container, a discharge nozzle in communication with said discharge pipe, a valve for controlling the communication between the discharge pipe and said nozzle, said valve being normally in closed position, and means for actuating said valve to permit the discharge of milk from the container through said pipe and nozzle.

8. A dispensing unit for milk containers of the class described comprising a closure plate, means for detachably supporting said plate within the container inwardly of the open end thereof and for forming an air tight connection of the plate with the container, a pressure element supply tube mounted in said plate and extending into the lower end of the container to place the milk therein under pressure and the upper end of said tube extending to the open end of the container to be coupled with a source of supply of the pressure element, a discharge pipe in said plate and opening into the bottom of the container and outwardly at a point above said plate and within the open end of said container, a discharge nozzle in communication with said discharge pipe, a valve for controlling the communication between the discharge pipe and said nozzle, said valve being normally in closed position, and means for actuating said valve to permit the discharge of milk from the container through said pipe and nozzle, said means including a manually operated member.

9. A dispensing unit for milk containers of the class described comprising a closure plate, means for detachably supporting said plate within the container inwardly of the open end thereof and for forming an air tight connection of the plate with the container, a pressure element supply tube mounted in said plate and extending into the lower end of the container to place the milk therein under pressure and the upper end of said tube extending to the open end of the container to be coupled with a source of supply of the pressure element, a discharge pipe in said plate and opening into the bottom of the container and outwardly at a point above said plate and within the open end of said container, a discharge nozzle in communication with said discharge pipe, a valve for controlling the communication between the discharge pipe and said nozzle, said valve being normally in closed position, means for actuating said valve to permit the discharge of milk from the container through said pipe and nozzle, said means involving a manually operated member, and tensional means for normally supporting said valve in closed position.

10. A dispensing unit for milk containers of the class described comprising a closure plate, means for detachably supporting said plate within the container inwardly of the open end thereof and for forming an air tight connection of the plate with the container, a pressure element supply tube mounted in said plate and extending into the lower end of the container to place milk therein under pressure and the upper end of said tube extending to the open end of the container to be coupled with a source of supply of the pressure element, a discharge pipe in said plate and opening into the bottom of the container and outwardly at a point above said plate and within the open end of said container, a discharge nozzle in communication with said discharge pipe, a valve for controlling the communication between the discharge pipe and said nozzle, said valve being normally in closed position, means for actuating said valve to permit the discharge of milk from the container through said pipe and nozzle, said means involving a manually operated member, tensional means for normally supporting said valve in closed position, and a check valve in the pressure element supply tube.

11. A fluid dispensing unit for fluid containers of the class described comprising a closure plate, means for detachably supporting said plate within the container inwardly of the open end thereof and for forming an air tight connection of the plate with the container, a pressure element supply tube mounted in said plate and extending into the lower end of the container to place the fluid thereof under pressure and the upper end of said tube extending to the open end of the container to be coupled with a source of supply of the pressure element, a fluid discharge pipe in said plate and opening into the bottom of the container and outwardly at a point above said plate and within the open end of said container, a discharge nozzle in communication with said discharge pipe, a valve for controlling the communication between the discharge pipe and said nozzle, said valve being normally in closed position, means for actuating said valve to permit the discharge of fluid from the container through said pipe and nozzle, and said discharge nozzle being rotatably supported in connection with said discharge pipe to permit normal positioning of the nozzle within the peripheral boundaries of the open end of the container and the extension of the discharge end thereof beyond said peripheral boundaries in the discharge of fluid from the container.

12. A fluid dispensing unit for fluid containers of the class described comprising a relatively flat closure plate detachably coupled with the container and forming an air tight connection therewith, two tubes extending from the plate downwardly into a container when the unit is attached therewith, one of said tubes forming means for introducing a pressure element into the container to apply sufficient pressure to the fluid therein to cause the discharge thereof through the other of said tubes, the first named tube extending to the lower portion of the container so that the pressure element introduced through the tube will pass through the fluid in said container, a valve casing at the upper end of the second named tube, a discharge nozzle on said casing, a valve intermediate the tube and nozzle controlling discharge of fluid from the container, manually actuated means for controlling the opening of the valve to discharge the fluid of the container through said nozzle, and said last named means including a diaphragm in the valve casing.

13. A fluid dispensing unit for fluid containers of the class described comprising a relatively flat closure plate detachably coupled with the container and forming an air tight connection therewith, two tubes extending from the plate downwardly into a container when the unit is attached therewith, one of said tubes forming means for introducing a pressure element into the container to apply sufficient pressure to the fluid therein to cause the discharge thereof through the other of said tubes, the first named tube extending to the lower portion of the container so that the pressure element introduced through the tube will pass through the fluid in said container, a valve casing at the upper end of the second named tube, a discharge nozzle on said casing, a valve intermediate the tube and nozzle controlling discharge of fluid from the container, manually actuated means for controlling the opening of the valve to discharge the fluid of the container through said nozzle, said last named means including a diaphragm on the valve casing, and means detachable with respect to the valve casing for supporting the diaphragm in connection therewith.

14. A fluid dispensing unit for fluid containers of the class described comprising a relatively flat closure plate detachably coupled with the container and forming an air tight connection therewith, two tubes extending from the plate downwardly into a container when the unit is attached therewith, one of said tubes forming means for introducing a pressure element into the container to apply sufficient pressure to the fluid therein to cause the discharge thereof through the other of said tubes, the first named tube extending to the lower portion of the container so that the pressure element introduced through the tube will pass through the fluid in said container, a valve casing at the upper end of the second named tube, a discharge nozzle on said casing, a valve intermediate the tube and nozzle controlling discharge of fluid from the container, manually actuated means for controlling the opening of the valve to discharge the fluid of the container through said nozzle, said last named means including a diaphragm on the valve casing, means detachable with respect to the valve casing for supporting the diaphragm in connection therewith, and tensional means for normally supporting the valve in closed position.

15. A fluid dispensing unit for fluid containers of the class described comprising a relatively flat closure plate detachably coupled with the container and forming an air tight connection therewith, two tubes extending from the plate downwardly into a container when the unit is attached therewith, one of said tubes forming means for introducing a pressure element into the container to apply sufficient pressure to the fluid therein to cause the discharge thereof through the other of said tubes, the first named tube extending to the lower portion of the container so that the pressure element introduced through the tube will pass through the fluid in said container, a valve casing at the upper end of the second named tube, a discharge nozzle on said casing, a valve intermediate the tube and nozzle controlling discharge of fluid from the container, manually actuated means for controlling the opening of the valve to discharge the fluid of the container through said nozzle, said last named means including a diaphragm on the valve casing, means detachable with respect to the valve casing for supporting the diaphragm in connection therewith, tensional means for normally supporting the valve in closed position, and a check valve in said first named tube.

HARRY J. HEINS.